United States Patent
Billieres

(10) Patent No.: US 6,941,993 B2
(45) Date of Patent: Sep. 13, 2005

(54) TIRE WITH SPECIFIED REINFORCING PLY

(75) Inventor: Jean Billieres, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 185 days.

(21) Appl. No.: 09/929,393

(22) Filed: Aug. 14, 2001

(65) Prior Publication Data

US 2002/0046795 A1 Apr. 25, 2002

Related U.S. Application Data

(63) Continuation of application No. PCT/EP00/01189, filed on Feb. 14, 2000.

(30) Foreign Application Priority Data

Feb. 19, 1999 (FR) .............................. 99 02145

(51) Int. Cl.⁷ .............................. B60C 9/04; B60C 9/00; B60C 9/08; B60C 9/20
(52) U.S. Cl. ......................... 152/564; 152/537; 156/133
(58) Field of Search ................. 152/564, 565, 152/537, 556; 156/133

(56) References Cited

U.S. PATENT DOCUMENTS

| | | |
|---|---|---|
| 3,172,445 A | 3/1965 | Boussu et al. |
| 3,392,774 A | 7/1968 | Le Bosse |
| 3,709,277 A | 1/1973 | Montagne |
| 4,140,166 A | 2/1979 | Koyama et al. |
| 6,179,029 B1 * | 1/2001 | Costa Pereira et al. . 152/564 X |
| 6,199,612 B1 * | 3/2001 | Costa Pereira et al. . 152/564 X |

FOREIGN PATENT DOCUMENTS

| | | |
|---|---|---|
| EP | 0454932 | 11/1991 |
| EP | 0619170 | 10/1994 |
| EP | 0 869 015 A1 * | 10/1998 |
| EP | 0 869 017 A1 * | 10/1998 |
| FR | 1419480 | 2/1965 |
| JP | 7186614 | 7/1995 |

* cited by examiner

Primary Examiner—Adrienne C. Johnstone
(74) Attorney, Agent, or Firm—Burns, Doane, Swecker & Mathis, LLP

(57) ABSTRACT

A tire having at least one reinforcement ply formed of reinforcement elements embedded in vulcanized rubber, characterized in that the reinforcement elements for said ply are individually coated in a rubber mix (B, B₁), referred to as "coating mix", having a given composition and physical properties, the reinforcement elements arranged parallel to each other being covered on one face by a first rubber layer (A, A₁), referred to as "first calendering layer", of constant composition and properties, whereas the elements are covered on the opposite face by a second rubber calendering layer (C, D), of composition and properties which are variable according to the meridian position on the ply within the tire.

7 Claims, 3 Drawing Sheets

TIRE WITH SPECIFIED REINFORCING PLY

This is a continuation of pending PCT/EP00/01189, filed Feb. 14, 2000.

BACKGROUND OF THE INVENTION

The present invention relates to a reinforcing ply for a tire, and also to a tire reinforced by such ply. It also relates to a process for manufacturing such a ply, and to a process for manufacturing the tire which uses said ply.

A reinforcing ply for a tire is formed of reinforcement elements generally covered on either side with layers of rubber mix referred to as calendering layers, such that said elements cannot be in contact with the outside. The rubber mix used is generally a single mix of the same composition and having the same properties.

It is sometimes highly desirable for the calendering mix to be different for the same ply depending on the location of said ply within the tire, be it a carcass reinforcement ply, a crown reinforcement ply, or any other reinforcing ply. According to the teaching of U.S. Pat. No. 4,140,166, a crown reinforcement having a plurality of plies of reinforcement elements which are parallel to each other within each ply and are crossed from one ply to the next must, in order to increase the life of the tire, be provided with different characteristics in its central zone and its marginal zones. The tire of said reference, comprising a carcass reinforcement and a crown reinforcement of a plurality of plies, is characterized in that the calendering rubber mix of the crown plies has a modulus of elasticity in tension at 100% elongation of greater than 70 kg/cm$^2$ in the median zone of the crown reinforcement, which zone is defined by the ratio of the width of said zone to the overall width of said reinforcement, and in that the calendering rubber mix of the same plies has a modulus of elasticity in tension at 100% elongation of less than 40 kg/cm$^2$ in the remaining two marginal zones of the crown reinforcement.

U.S. Pat. No. 3,172,445 relates to a tire with radial carcass reinforcement, and the invention described consists in stiffening the bottom part of the sidewalls, by imparting thereto a lesser rigidity than that permitted by the solution currently used, that is to say, the lateral superposition of crossed cables on the radial carcass reinforcement. To this end, the stiffening of the sidewalls, in the zone between the bead and substantially the mid-sidewall, is obtained by means of at least one ply of meridian reinforcement elements coated in the calendering mix of the carcass reinforcement. In one of the embodiments described, the carcass reinforcement is formed of a single ply of radial metallic cords or cables, which is turned up around the bead wire and ends in the bead, these cords or cables being coated in the zone located between the bead and substantially the mid-sidewall with calendering layers the elasticity modulus of which is at least 350 g/mm$^2$, which modulus is a high modulus compared with the modulus of the remaining calendering mix.

U.S. Pat. No. 3,709,277 discloses that, in certain tires with radial carcass reinforcement, the selection of the rubber connecting the reinforcement elements is an essential factor in the appearance or non-appearance of certain defects after travel of the tire. Thus the selection of a connecting rubber of low elasticity modulus promotes the separation of the carcass reinforcement cables at the end of the upturn of said reinforcement, in the beads and in the regions of the sidewall which are close to the beads, more particularly for the carcass ply which has a high upturn in the sidewalls. Furthermore, the selection of a connecting rubber of high elasticity modulus promotes the tearing of the connecting rubber between carcass reinforcement cables, along the radial lines in the top zone of the sidewalls. To obtain the best results, U.S. Pat. No. 3,709,277 advocates, more particularly for tires with radial carcass reinforcement, surrounding the cables of relatively elastic material with a layer of coating rubber of relatively high elasticity modulus, said cables being separated by an interstitial rubber mix which is of relatively low elasticity modulus in the top zone of the sidewalls and of relatively high elasticity modulus in the bottom zone of the sidewalls, the coating layer and the interstitial layer having the same moduli in the bottom zone. As for the process for ensuring that in the top zone of the sidewalls the coating rubber of the cables and the interstitial rubber between cables of one and the same ply are of different qualities, while they are identical in the bottom zone, it consists, during the production of the tire, of arranging, radially to the inside of a ply, calendered cables in a layer of rubber of a first quality, a layer of rubber of a second quality, and during the vulcanization of the tire, exerting a tension on the carcass reinforcement cables.

Be it one or the other of the prior solutions, be it for a carcass reinforcement or for a crown reinforcement, the processes used for obtaining a reinforcing ply as described do not make it possible, given the many factors affecting the quality of the semi-finished product constituted by the ply in the non-vulcanized state, to obtain the optimum structure of said ply depending on whether it is used in a carcass reinforcement or in a crown reinforcement, and even less the effective use thereof in the production of a tire.

SUMMARY OF THE INVENTION

The object of the invention is to overcome these disadvantages. It proposes a tire having at least one reinforcing ply formed of reinforcement elements embedded in vulcanized rubber, characterized in that the reinforcement elements for said ply are individually coated in a rubber mix, referred to as "coating mix", having a given composition and physical properties, said reinforcement elements arranged parallel to each other being covered on one face by a first rubber layer, referred to as "first calendering layer", of constant composition and properties, whereas said elements are covered on the opposite face by a second rubber calendering layer of composition and properties which are variable according to the meridian position on the reinforcing ply within the tire.

The composition and properties of the first calendering layer may be identical to the composition and properties of the coating mix for the reinforcement elements. Advantageously, said composition and properties of the first layer will be different from those of said coating mix.

The reinforcing ply may be a carcass reinforcement ply, for example a radial ply, the reinforcement elements of which may be metallic and/or textile ones: the meridian position is then determined by the meridian length of the ply. The reinforcing ply may be a crown reinforcement ply, for example formed of reinforcement elements which are parallel to each other within said ply and form an acute angle with the circumferential direction of the tire, or formed of circumferential elements, the meridian position being determined by the axial width of said ply. It may also be any other reinforcement ply commonly or very frequently used in a tire, such as the bead reinforcement plies, the sidewall reinforcement plies, the meridian position then being able to be compared to a radial height.

The process for manufacturing the non-vulcanized reinforcing ply necessary to obtain the ply according to the invention, as a semi-finished product, consists in firstly manufacturing an intermediate product referred to as "one-face calendered ply", obtained by individually coating a plurality of reinforcement elements with a rubber mix by means of an extruder having a plurality of spinnerets, followed by arranging, using a suitable means, said coated elements in parallel lines, maintaining a defined spacing between two adjacent elements, one of the faces of the assembly of coated elements which are obtained being provided with a first non-vulcanized calendering layer also referred to as a supporting layer, by placing said calendering layer in contact with said assembly.

The contacting of said calendering layer with the assembly of the coated reinforcement elements may be effected either by simply laying the assembly on the calendering layer or by simply laying the calendering layer on the assembly of reinforcement elements, but preferably in both cases with application of slight pressure on one or both of the components, namely the assembly of elements and the calendering layer.

The non-vulcanized "one-face calendered ply" may be used with reinforcement elements coated individually in a rubber mix which is either non-vulcanized or pre-vulcanized. The process relating to the latter possibility comprises an additional step consisting in pre-vulcanizing the coating mix at a given temperature by means of a suitable heating means.

The "one-face calendered ply", which is produced continuously, may be wound up on itself, as is known per se, by means of a backing layer, either of fabric or of polyethylene, for example, acting as an anti-adhesion means, to form rolls of ply. Said rolls serve to feed a table for preparing the plies according to whether they are carcass plies or crown plies. As is known per se, the preparation of a carcass ply requires the reinforcement elements to be cut perpendicular to their common direction, so as to obtain the desired meridian length, whereas the preparation of a crown ply requires the reinforcement elements to be cut at a certain angle and for the portions of ply obtained to be butt-joined to result in the desired circumferential length of the crown ply.

The manufacture of the reinforcing ply intended to be used in the tire is completed and terminated by the addition, to the second face of the "one-face calendered ply" of coated, cut reinforcement elements, of the second calendering layer, said second layer not having constant composition and properties. Said addition may be effected in several ways:

either by contacting the "one-face calendered ply", after cutting, with the second calendering layer of composition and properties which are variable according to the meridian position, which layer has been prepared beforehand, for example, on an apparatus independent of the cores or drums for building and/or finishing the non-vulcanized carcass reinforcement and/or tire blanks (for example, a ply preparation table), said contacting possibly being effected either by laying the "one-face calendered ply" on the second calendering layer, or by laying said second calendering layer on the appropriate face, on which face are visible the coated reinforcement elements of the "one-face calendered ply", said second layer possibly being in the form of bands of mixes of composition and properties which differ from one band to the axially adjacent band, or in the form of a single layer of mix in which the transition from one band composition to another band composition takes place gradually, and/or continuously;

or preferably by contacting the "one-face calendered ply", after cutting, with the second calendering layer of composition and properties which are variable according to the meridian position, which layer is prepared on the apparatus used for building and/or finishing the non-vulcanized carcass reinforcement and/or tire blanks (cylindrical building drum for the carcass reinforcement blank, finishing drum for the tire blank in toric form), said contacting possibly being effected either by laying the "one-face calendered ply", on which face the coated reinforcement elements are visible, on the second calendering layer initially arranged on the non-vulcanized blank during manufacture, or by laying the second calendering layer on the "one-face calendered ply" predisposed on the blank during production, said second layer possibly being in the two forms referred to above.

The characteristics of the invention will be better understood with reference to the following description, which refers to the drawings, illustrating in non-limitative manner several examples of embodiments.

DESCRIPTION OF PREFERRED EMBODIMENTS

Figure 1:
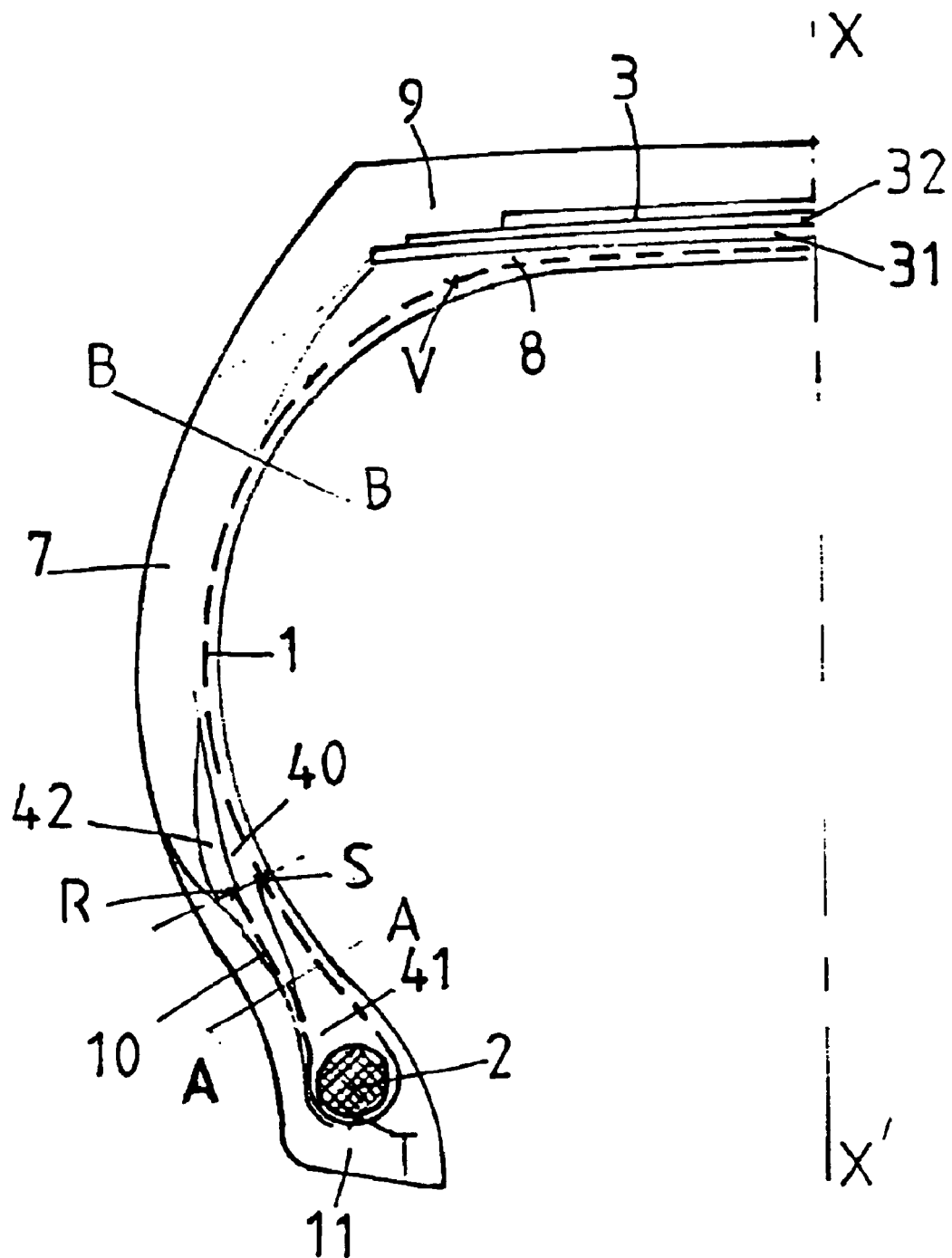
FIG. 1 is a schematic, viewed in meridian section, of a tire comprising crown plies and a carcass ply which are in accordance with one embodiment of the invention.

The tire shown in FIG. 1 is a tire of the "heavy vehicle" type of small dimensions 9.00/20X. It has a radial carcass reinforcement, formed of a single ply 1 of reinforcement elements, in this case inextensible metal cables, which is anchored within each bead to an annular bead reinforcement element, in this case a bead wire 2, to form an upturn 10. Said carcass reinforcement is surmounted radially by a crown reinforcement 3, composed firstly of two working crown plies 31, 32, formed of inextensible metal cables which are parallel to each other within each ply and are crossed from one ply 31 to the next 32, forming angles of between 10° and 45° with the circumferential direction, and in the case described equal to 26° and 18° respectively, and secondly, radially to the outside, of a ply of elastic metal cables which are oriented relative to the circumferential direction at the same angle as the angle of the cables of the radially outermost working crown ply 32. The crown reinforcement 3 is radially joined to the carcass reinforcement 1 by a layer 8 of rubber mix which is of constant thickness in the central part, and of increasing thickness towards the edges of the crown reinforcement 3. Said crown reinforcement 3 is radially surmounted by a tread 9, which is joined on either side of the equatorial plane to a sidewall mix 7 covering, within the sidewall of the tire, the carcass reinforcement 1 and forming joinders, firstly, with the mixes 40, 41, 42 reinforcing the bead and, secondly, with the mix 11 protecting said bead and providing the contact with the service rim. An inner coating layer 5 of the tire cavity and different rubber reinforcements between said layer and the carcass reinforcement complete the tire.

Figure 2:
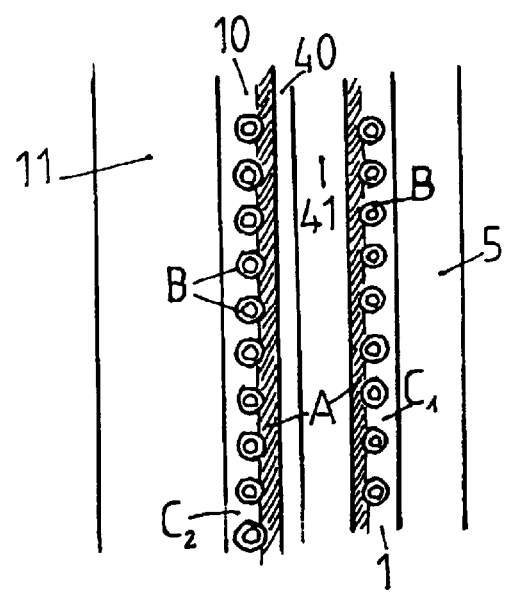
FIG. 2 is a section along A—A of FIG. 1.

The carcass reinforcement ply 1, in the example described, is formed of inextensible metal cables of steel which are coated in a rubber mix B, the composition of which is such that said mix, in the vulcanized state, adheres perfectly to the brass-coated layer covering the steel of the reinforcement cables. Said cables coated with the mix B are calendered over the entire meridian length of the outer side of the carcass ply 1, including the carcass ply upturns, by a layer of rubber mix A, the first calendering layer or supporting layer, because this is the layer on or beneath which the carcass ply cables are laid during the manufacture of the "one-face calendered ply". As for the inner calendering layer of the ply 1, which is the second calendering layer C, it is formed of a plurality of circumferential bands or layers of rubber mixes of composition and qualities which differ from one band to the adjacent band, the composition and the properties of a band being selected according to the meridian position of said band on the meridian length of the carcass: from the point T of the bead wire 2 radially closest to the axis of rotation to the point S, the point of intersection S between the average axis of the meridian profile of the carcass ply 1 and the line perpendicular to said profile lowered by the end of the upturn 10 of the ply 1, the zone TS being referred to as "bead zone", the layer C is formed of a first band $C_1$ of rubber mix. From said point T to the point R representing the end of the upturn 10 of the carcass ply 1, the zone TR being referred to as the "upturn zone", the layer C is formed of a second band $C_2$ of rubber mix (FIG. 2 shows the different layers in the bead zone of the tire). Between the point S and a point of intersection V of the center axis of the meridian profile of the carcass ply 1 with a straight line parallel to the equatorial plane and distant from said plane by a quantity which may be between 30% and 45% of the axial width of the tread 9, in the case described equal to 35% of said tread width, the zone SV being referred to as the "sidewall and shoulder zone", the layer C is formed of a third band $C_3$ of rubber mix. Between the point V and the equatorial plane XX' forming the so-called crown zone, the fourth band $C_4$ of mix forms the layer C.

Figure 3:
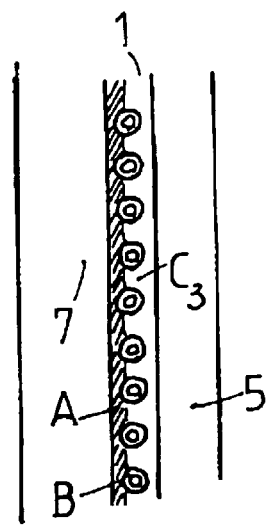
FIG. 3 is a section along B—B of FIG. 1.

In the example illustrated in FIGS. 1 to 3, the layers or bands A, B, $C_1$, $C_2$ and $C_4$ are formed of one and the same rubber mix which, in the vulcanized state, has a secant modulus of elasticity in tension, measured at a relative elongation $\in$ of 0.1 (the modulus thus defined is determined in accordance with Standard AFNOR-NF-T46-002 under normal conditions of temperature and humidity in accordance with Standard AFNOR-NF-T40-101, and will be referred to more simply as "modulus" in the rest of the description), which lies between 6 MPa and 12 MPa, whereas the mix of the calendering layer $C_3$ of the part of the carcass ply 1 in the sidewall and shoulder zone is formed of a rubber mix, the modulus of which of the same name and measured under the same conditions is substantially lower, since it is between 3.5 MPa and 5 MPa. The first mix above, in the non-vulcanized state, has a relatively high Mooney viscosity of between 60 MU and 90 MU, whereas the mix of the layer $C_3$ has a lower Mooney viscosity since it is between 55 MU and 75 MU (the Mooney viscosity being measured in accordance with Standard AFNOR-NF-T43-005).

For another dimension of tire, and according to the endurance damage encountered on such a dimension, the coating layer B will be produced with a mix of very high modulus of between 27 MPa and 45 MPa, and of very high Mooney viscosity of between 70 MU and 100 MU, whereas the supporting layer A will be formed of a mix of lower modulus than the previous one, but one which is still high, since it is between 10 MPa and 15 MPa, and having a high Mooney viscosity which itself is high and lies between 60 MU and 90 MU. The layer $C_1$ will be formed of the same mix as the layer A; on the other hand, the layer $C_2$ will be a band of a mix having a modulus which is low, since it lies between 3.5 MPa and 5 MPa, and having a lower Mooney viscosity of between 55 MU and 75 MU, which mix will also be that of the band $C_3$, whereas the layer $C_4$ will be produced with a mix of intermediate modulus, of between 6 MPa and 12 MPa, and of a viscosity of between 60 MU and 90 MU.

Another beneficial solution consists in selecting as rubber mix for the supporting layer A a mix of low elasticity modulus in the vulcanized state, and using said supporting layer as internal liner of the carcass ply 1, the layers $C'_1$, $C'_3$ and $C'_4$ then forming the outer calendering layer C' of the carcass ply 1. The mix of layer B will be identical to that of the previous example, the mix of layer A will be the mix forming the layer $C_2$ of the previous example with a modulus of between 3.5 MPa and 5 MPa, and a viscosity of between 55 MU and 75 MU. From a point U on the carcass ply upturn which is located radially substantially at mid-height of said upturn 10 to the point S previously described, passing beneath the bead wire 2, the band $C'_1$ is formed of a mix of high elasticity modulus of between 10 MPa and 15 MPa, and of high viscosity of between 60 MU and 90 MU, whereas from said point U to the point R of the end of the upturn 10, the band $C'_2$ will be formed of the same mix as that forming the supporting layer A. The same applies for the layer $C'_3$ from the point S to the point V, whereas the layer $C'_4$ will be formed of the same mix as that forming the layer $C_4$ of the previous example.

It will fall within the scope of the invention if the layer C, be it the inner or outer calendering layer, is obtained by winding a strip of rubber mix, the composition and the properties of which vary continuously, and/or the passage or transition from one composition of mix in one zone of the carcass ply to the composition of the mix in an adjacent zone is effected gradually (for example passing from the mix forming the layer $C_3$ to the mix forming the layer $C_4$): the strip for forming the layer C may be obtained, as is known per se, by kneading and/or mixing in a crusher-mixer one or two quantities of rubber granules (in the example selected, granules of the two mixes forming the layers $C_3$ and $C_4$), the crusher-mixer being fed from a plurality of hoppers each containing a rubber mix of given composition and properties in the form of granules, and the desired quantities being obtained by opening feed chutes, this opening being governed by feed control gates, which makes it possible to obtain a zone of transition between the layers $C_3$ and $C_4$ in which the mix forming $C_3$ gradually changes composition to become the mix forming $C_4$.

Figure 4:
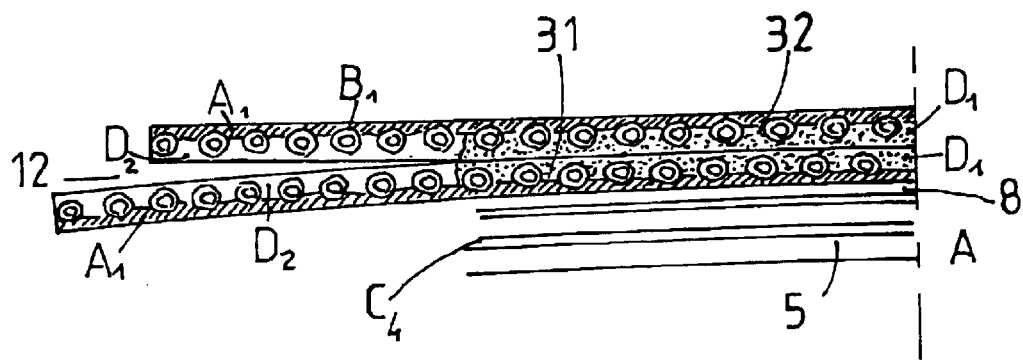
FIG. 4 is a schematic, viewed in meridian section, of a crown reinforcement composed of two plies.

FIG. 4 shows a working crown reinforcement 3 formed of two plies 31 and 32. The working ply 31 radially closest to the axis of rotation is formed of a plurality of metal cables of steel which are coated individually in a rubber mix $B_1$ which, in the example described, has a very high modulus of extension since it is between 15 MPa and 30 MPa, and a Mooney viscosity which is likewise high, of between 65 MU and 95 MU. Radially to the inside, there is the first calendering layer or supporting layer $A_1$, which is formed of a single rubber mix of composition and properties which are identical to the composition and properties of the coating mix $B_1$. Radially to the outside, there is the second calendering layer D formed of a plurality of zones of mixes of different composition and properties:

a central zone $D_1$, of axial width 1 of between 70% and 90% of the axial width $L_S$ common to the two working plies 31 and 32, is formed of a mix of high modulus of between 15 MPa and 30 MPa, and of a viscosity of between 65 MU and 95 MU, which mix is therefore identical to the mixes forming the supporting layer $A_1$ and the coating $B_1$ of the cables;

of two lateral bands $D_2$, in the case described of identical width, formed of a rubber mix of a modulus which is relatively low since it is between 3 MPa and 9 MPa, and of a Mooney viscosity of between 50 MU and 85 MU.

As for the working crown ply 32 radially farther from the axis of rotation than the ply 31, and of axial width less than said ply 31, it is of identical constitution to that of the ply 31, but the supporting layer $A_1$ is then radially located to the outside of the ply and the three zones $D_1$ and $D_2$ of the layer D are radially to the inside of said layer D, such that said three zones of the ply 32 are opposite the three zones of the first ply 31, in particular the lateral zones $D_2$ of mix of low elasticity modulus, which makes it possible substantially to reduce the thickness of the rubber wedge 12 arranged between the two ply edges and to lay it in the form of flat bands during building.

Figure 5:
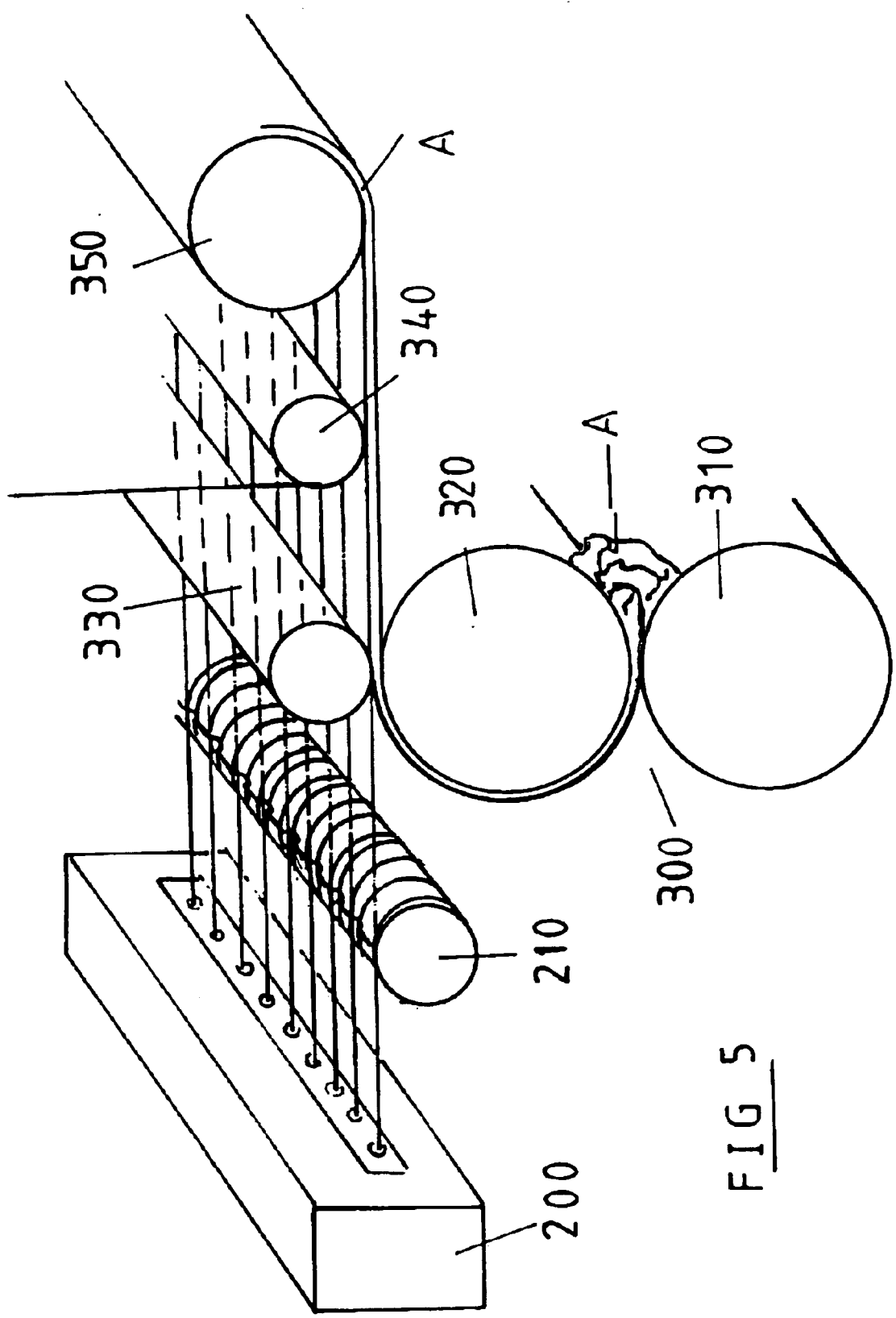
FIG. 5 is a schematic of the different stages of manufacture of a "one-face calendered ply".

The manufacture of the tire according to the invention requires several preliminary stages before the vulcanization of said tire, and in particular the building or manufacture of said "one-face calendered ply". FIG. 5 shows an apparatus in which a plurality of cables are fed from a set of reels on which the metal cables have been wound to an extruder 200, the head of which has a plurality of spinnerets, suitable for coating said cables with the layer (B, $B_1$) of coating mix to a predetermined thickness. Said coated cables are then sent to a tool, in this case a fluted roller 210, which makes it possible to separate each cable from the axially adjacent cable by the desired distance or pitch, and then to a calender 300 having two rollers 310 and 320. A quantity of rubber mix which is to form the supporting layer (A, $A_1$) of the "one-face calendered ply", initially preheated to a temperature making it possible to soften said mix without, however, vulcanizing or pre-vulcanizing it, is introduced between the two rollers 310 and 320. The passage between the two rollers results in a flat band of mix being obtained, on which the coated cables will make contact with the radially upper part of the upper roller 320. An auxiliary roller 330, referred to as press roller, makes it possible to apply a given pressure to the cables if necessary, this pressure being automatically controlled according to the desired depth of embedding of the cables in the flat band A. A roller 340 correctly lays an anti-adhesion backing strip, generally of polyethylene, either on the face on which the coated cables are visible, or on the opposite face, so as to be able to wind, as known per se, the "one-face calendered ply" on a winding roller 350, intended to supply the cutters and the ply preparation tables, the reinforcement elements being in the direction of the length of the ply.

As known per se, the "one-face calendered ply", depending on whether a web width for a carcass ply or a web width for a crown ply is being prepared, is cut either perpendicularly to the common direction of the reinforcement elements, or at a certain angle a relative to said common direction of the reinforcement elements; in the finished tire, this angle α will be the angle of the elements relative to the circumferential direction of said tire. The web widths thus obtained are then assembled, butt-jointed, either end-to-end for metallic reinforcement elements, or with one end overlapping the other for textile reinforcement elements. In the case of end-to-end butt-jointing, this can be effected by applying a small flat layer of so-called connecting rubber, laid on the joint or placed on one of the edges, then passing beneath the other edge.

The web widths thus assembled form the "one-face calendered ply" ready for use, for example, on the means for manufacturing the partial non-vulcanized blank of the tire. The carcass ply is completed, for example, by laying the "one-face calendered ply" on the different layers of rubber mixes and different bead reinforcement plies prearranged on the cylindrical building drum for the cylindrical carcass blank, such that the supporting layer A is arranged radially to the inside. On the visible reinforcement elements of the "one-face calendered ply" there are then laid the different circumferential layers $C_1$, $C_2$, $C_3$, etc. which are necessary to form the outer calendering layer C, said layers being, in the non-vulcanized state, of thicknesses selected to obtain the desired thicknesses in the vulcanized state, taking into account the shaping ratio of the carcass blank transforming said cylindrical blank into a toric carcass reinforcement blank. Since the carcass ply is finished on the cylindrical building drum, the next stages of said building are the usual steps which are known per se: laying of the anchoring bead wires for the carcass ply, laying the different rubber bead fillers, edging rubbers or others, turning up the edges of the carcass ply around the bead wires and fillers, etc.

The production of a complete crown ply 31 is also finished in the same manner, that is to say, on a building drum for a non-vulcanized tire blank: after laying, on a non-vulcanized, toric carcass reinforcement blank, the different layers 8 of rubber mixes radially separating the carcass reinforcement 1 from the crown reinforcement 3 there is laid a non-vulcanized "one-face calendered ply", formed of reinforcement elements coated individually in a rubber mix $B_1$, having a given composition and properties, said reinforcement elements arranged parallel to each other being covered on one face by a first rubber layer $A_1$ or supporting layer, of constant composition and properties, said "one-face calendered ply" being placed in contact with a second calendering layer D of composition and properties which are variable according to the axial width of the crown ply 31 in the tire. As for the manufacture of a working crown reinforcement 3 with two plies 31 and 32, there can be laid on the layers 8 a first "one-face calendered ply", the supporting layer $A_1$ of said ply being radially to the inside, then, on the visible reinforcement elements of said first "one-face calendered ply" there are laid the different layers of rubber mix $D_1$ and $D_2$ forming the second calendering layer of said first crown ply 31, radially closest to the carcass reinforcement. The second crown ply 32 is manufactured identically, but starting with the laying of the layers $D_1$ and $D_2$, which are then covered radially with a second "one-face calendered ply", presented such that the visible reinforcement elements of said second ply are radially to the inside of said ply.

The finishing and vulcanization of the toric tire blank are then performed in the conventional, known manner.

I claim:

1. A tire having a tread layer and at least one carcass reinforcing ply formed of reinforcement elements sandwiched between first and second calendering layers, wherein the reinforcement elements are individually coated in a rubber coating mix and are arranged parallel to each other, the first rubber calendering layer being of constant composition and properties, the composition and properties of the second calendering layer being varied according to the meridian position on the ply within the tire, wherein the second rubber calendering layer is in non-contacting, spaced relationship to the tread layer, wherein the carcass reinforcing ply has a main part and an upturned part, each part having an inner and outer face, and in which, in the main part on its axially outer face and the upturned part on its axially inner face, the carcass reinforcing ply is calendered with the first layer of constant composition and properties, whereas the opposite faces are covered with the second calendering layer of composition and properties which are varied according to the medium length of the ply within the tire.

2. A tire according to claim 1, characterized in that the composition and properties of the first layer (A, $A_1$) are identical to the composition and properties of the coating mix (B, $B_1$) of the reinforcement elements of the ply.

3. A tire according to claim 1, characterized in that the coating mix B has the same composition and properties as those of the mix of the first calendering layer A, the secant modulus of elasticity in tension of said mix in the vulcanized state, measured at a relative elongation of 0.1, being between 6 and 12 MPa, whereas the Mooney viscosity of said mix in the non-vulcanized state is between 60 MU and 90 MU.

4. A tire according to claim 1, having a tread and in which the carcass reinforcement ply forms an upturn about a bead wire, characterized in that the second layer C is formed:
of a first band $C_1$ of rubber mix, extending from a point T of the bead wire radially closest to the axis of rotation to a point of intersection S between the average axis of the meridian profile of the carcass ply and a line perpendicular to said profile lowered by the end of the upturn of the ply, the zone TS being referred to as the "bead zone",
of a second band $C_2$ of rubber mix, extending from said point T to a point R representing the end of the upturn of the carcass ply, the zone TR being referred to as the "upturn zone",
of a third band $C_3$ of rubber mix, between the point S and a point of intersection V of the average axis of the meridian profile of the carcass ply with a straight line parallel to the equatorial plane and distant from said plane by an amount between 30% and 45% of the axial width of the tread, the zone SV being referred to as the "sidewall and shoulder zone",
of a fourth band $C_4$ of rubber mix, between the point V and the equatorial plane XX', forming what is called the "crown zone", the bands $C_1$, $C_2$ and $C_4$ being formed of the same mix, the elasticity modulus of which is between 6 MPa and 12 MPa and the Mooney viscosity of which is between 60 MU and 90 MU, whereas the band $C_3$ is formed of a mix, the elasticity modulus of which is between 3.5 MPa and 5 MPa and the Mooney viscosity of which is between 55 MU and 75 MU.

5. A tire according to claim 1, having a tread and in which the carcass reinforcing ply forms an upturn about a bead wire, characterized in that the second layer C is formed:
of a first band $C_1$ of rubber mix, extending from a point T of the bead wire radially closest to the axis of rotation, to a point of intersection S between the average axis of the meridian profile of the carcass ply and the line perpendicular to said profile lowered by the end of the upturn of the ply, the zone TS being referred to as the "bead zone",
of a second band $C_2$ of rubber mix, extending from said point T to a point R representing the end of the upturn of the carcass ply, the zone TR being referred to as the "upturn zone",
of a third band $C_3$ of rubber mix, between the point S and a point of intersection V of the average axis of the meridian profile of the carcass ply with a straight line parallel to the equatorial plane and distant from said plane by an amount which may be between 30% and 45% of the axial width of the tread, the zone SV being referred to as the "sidewall and shoulder zone",
of a fourth band $C_4$ of rubber mix, between the point V and the equatorial plane XX', forming what is called the "crown zone", the bands $C_2$ and $C_3$ being formed of the same mix, the elasticity modulus of which is between 3.5 MPa and 5 MPa and the Mooney viscosity of which is between 55 MU and 75 MU, whereas the band $C_1$ is formed of a mix, the elasticity modulus of which is between 10 MPa and 15 MPa and the Mooney viscosity of which is between 60 MU and 90 MU, and that the band $C_4$ is formed of a mix, the elasticity modulus of which is between 6 MPa and 12 MPa and the Mooney viscosity of which is between 60 MU and 90 MU.

6. A tire according to claim 1, including a tread and in which the carcass reinforcing a ply forms an upturn about a bead wire, characterized in that the second layer C is formed:
of a first band $C'_1$ of rubber mix, extending from the point U of the upturn of the carcass ply, located substantially at mid-height of said upturn, to a point of intersection S between the center axis of the meridian profile of the carcass ply and a line perpendicular to said profile lowered by the end of the upturn of the ply,
of a second band $C'_2$ of rubber mix, extending from said point U to a point R representing the end of the upturn of the carcass ply,
of a third band $C_3$ of rubber mix, between the point S and a point of intersection V of the center axis of the meridian profile of the carcass ply with a straight line parallel to the equatorial plane and distant from said plane by an amount which may be between 30% and 45% of the axial width of the tread, the zone SV being referred to as the "sidewall and shoulder zone",
of a fourth band $C_4$ of rubber mix, between the point V and the equatorial plane XX', forming what is called the "crown zone", the bands $C'_2$ and $C'_3$ being formed of the same mix, the elasticity modulus of which is between 3.5 MPa and 5 MPa and the Mooney viscosity of which is between 55 MU and 75 MU, whereas the band C'1 is formed of a mix, the elasticity modulus of which is between 10 MPa and 15 MPa and the Mooney viscosity of which is between 60 MU and 90 MU, and that the band C'4 is formed of a mix, the elasticity modulus of which is between 6 MPa and 12 MPa and the Mooney viscosity of which is between 60 MU and 90 MU.

7. A process of manufacturing a tire comprising the steps of:
A) building on a drum a non-vulcanized tread layer and at least one carcass reinforcing ply formed of reinforcing elements sandwiched between first and second non-vulcanized rubber calendering layers, wherein the reinforcing elements are individually coated in a rubber coating mix and are arranged parallel to one another, the composition and properties of the first calendering layer being constant, and the composition and properties of the second calendering layer being varied according to the meridian position on the ply within the tire, wherein the carcass reinforcing ply has a main part and an upturned part, each part having an inner and outer face, and in which, in the main part on its axially outer face and the upturned part on its axially inner face, the carcass reinforcing ply is calendered with the first layer of constant composition and properties, whereas the opposite faces are covered with the second calendering layer of composition and properties which are varied according to the meridian length of the ply within the tire; and
B) vulcanizing the tread layer and the first and second calendering layers, with the second calendering layer positioned in non-contacting, spaced apart relationship to the tread layer.

* * * * *